(12) United States Patent
Ford et al.

(10) Patent No.: US 8,928,988 B1
(45) Date of Patent: Jan. 6, 2015

(54) MONOCENTRIC IMAGING

(75) Inventors: Joseph E. Ford, Solana Beach, CA (US); Eric Tremblay, Fruitvale (CA)

(73) Assignee: The Regents of the University of California, Oakland, CA (US)

( * ) Notice: Subject to any disclaimer, the term of this patent is extended or adjusted under 35 U.S.C. 154(b) by 13 days.

(21) Appl. No.: 13/437,907

(22) Filed: Apr. 2, 2012

Related U.S. Application Data

(60) Provisional application No. 61/471,088, filed on Apr. 1, 2011.

(51) Int. Cl.
G02B 3/00 (2006.01)
G02B 7/02 (2006.01)
F24J 2/08 (2006.01)

(52) U.S. Cl.
CPC .. G02B 7/027 (2013.01); F24J 2/08 (2013.01)
USPC .......................................... 359/664; 359/709

(58) Field of Classification Search
USPC .................................. 359/728, 731, 664, 709
See application file for complete search history.

(56) References Cited

U.S. PATENT DOCUMENTS

| | | | |
|---|---|---|---|
| 4,110,123 A | 8/1978 | Goetzberger et al. | |
| 4,124,798 A * | 11/1978 | Thompson | 250/214 VT |
| 4,149,902 A | 4/1979 | Mauer et al. | |
| 4,184,749 A | 1/1980 | Grossman | |
| 4,281,294 A | 7/1981 | Volkin | |
| 4,292,959 A | 10/1981 | Coburn, Jr. | |
| 4,297,521 A | 10/1981 | Johnson | |
| 4,411,490 A | 10/1983 | Daniel | |
| 4,461,278 A | 7/1984 | Mori | |
| 4,723,826 A | 2/1988 | Whitaker | |
| 4,902,089 A | 2/1990 | Mori | |
| 5,022,736 A | 6/1991 | Mori | |
| 5,581,408 A | 12/1996 | Schumtz et al. | |

(Continued)

FOREIGN PATENT DOCUMENTS

| | | |
|---|---|---|
| CN | 101138101 A | 3/2008 |
| EP | 0141868 A1 | 5/1985 |

(Continued)

OTHER PUBLICATIONS

"E-Ncore T1000 Cell—Triple-Junction High-Efficiency Solar Cells for Terrestrial Concentrated Photovoltaic Applications," Product Brief 2006, obtained online May 31, 2012, <<http://www.emcore.com/assets/photovoltaics/T1000%20Data%20Sheet%20March%2007.pdf>>.

(Continued)

*Primary Examiner* — William Choi
(74) *Attorney, Agent, or Firm* — Perkins Coie LLP

(57) ABSTRACT

Methods and systems are provided to enable the capture of large (e.g., Gigapixel) images with high image quality using optical imaging systems that have a small form factor. The disclosed systems can be manufactured in a cost effective fashion, and can be readily assembled, aligned, tested and utilized. One such system comprises a monocentric primary optics section that includes one or more surfaces adapted to form a symmetrical arrangement around a common point of origin. The system also includes a secondary optics section that includes a plurality of secondary optics subsections, where each secondary optics subsection can intercept at least a portion of the light collected by the monocentric primary optics section. The combination of the primary optics section and the secondary optics section is adapted to form an image.

29 Claims, 14 Drawing Sheets

(56) References Cited

U.S. PATENT DOCUMENTS

| | | |
|---|---|---|
| 7,391,939 B1 | 6/2008 | Williams |
| 2004/0212882 A1 | 10/2004 | Liang et al. |
| 2006/0185713 A1 | 8/2006 | Mook |
| 2007/0125415 A1 | 6/2007 | Sachs |
| 2008/0223443 A1 | 9/2008 | Benitez et al. |
| 2009/0064993 A1 | 3/2009 | Ghosh et al. |
| 2009/0199889 A1 | 8/2009 | Willmott |
| 2010/0032005 A1 | 2/2010 | Ford et al. |
| 2010/0200044 A1 | 8/2010 | Zaban et al. |
| 2011/0211106 A1 | 9/2011 | Marks et al. |
| 2011/0226332 A1 | 9/2011 | Ford et al. |

FOREIGN PATENT DOCUMENTS

| | | |
|---|---|---|
| EP | 0848432 A2 | 6/1998 |
| JP | 02-197005 A | 8/1990 |
| JP | 11-340493 A | 12/1999 |
| JP | 2004-047753 A | 2/2004 |
| WO | 00/74147 A1 | 12/2000 |
| WO | 2006/088370 A2 | 8/2006 |
| WO | 2007/138589 A2 | 7/2007 |
| WO | 2008/091290 A2 | 7/2008 |
| WO | 2008/131561 A1 | 11/2008 |
| WO | 2010/033859 A2 | 3/2010 |

OTHER PUBLICATIONS

Barnett, A., et al, "50% Efficient Solar Cell Architectures and Designs," IEEE Conference Record of the 2006 IEEE 4th World Conference on Photovoltaic Energy Conversion, vol. 2, pp. 2560-2564. May 2006.

Barnett, A., et al, "Milestones Toward 50% Efficient Solar Cells," 22nd European Photovoltaic Solar Energy Conference, Milan Italy, Paper 1AO.6.7, pp. 95-100, Sep. 2007.

Campbell, P., et al., "The Limiting Efficiency of Silicon Solar Cells under Concentrated Sunlight," IEEE Transactions on Electron Devices, 33(2):234-239, Feb. 1986.

Chan, T.K., et al., "1092 Channel 2-D Array Dernultiplexer for Ultraiarge Data Bandwidth," IEEE Journal of Lightwave Technology, 25(4719-725, Mar. 2007.

Chan, T.K., et al., "Retroreflecting Optical Modulator Using a MEMS Deformable Micromirror Array," IEEE Journal of Ughtwave Technology, 24(1):516-525, Jan. 2006.

Chou, P.Y., et al., "Massively parallel manipulation of single cells and microparticles using optical images," Nature, vol. 436, pp. 370-372. Jul. 2005.

Currie, M.J. et al "High-Effciency Oganic Solar Concentrators for Photovoltaics" Science, 321(5886):226-228, Jul. 2008.

Efron, U., et al., "The silicon liquid-crystal light valve," Journal of Applied Physics, 57(4)1356-1368, Feb. 1985.

Energy Information Administration (EIA), "Solar Thermal and Photovoltaic Collector Manufacturing Activities 2006," 41 pages, Oct. 2007.

Ford, J.E., et al., "Dynamic Spectral Power Equalization Using Micro-Opto-Mechanics," IEEE Photonics Technology Letters, 10(10):1440-1442, Oct. 1998.

Ford, J.E., et al., "Wavelength Add/Drop Switching Using Tilting Micromirrors," IEEE Journal of Lightwave Technology, 17(5):904-911, May 1999.

Garboushian, V., et al., "Integrated high-concentration PV near-term alternative for low-cost large-scale solar electric power," Solar Energy Materials and Solar Cells, 47(1-4):315-323, Oct. 1997.

Goetzberger, A., et al., "Solar energy conversion with fluorescent collectors," Applied Physics, 14:123-139, Oct. 1977.

Green, M., et al., "Solar Cell Efficiency Tables (version 22)," Progress in Photovoltaics: Research and Applications, 11(5):347-352, Aug. 2003.

Im, C., et al., "Photoconduction in organic donor-acceptor systems," Journal of Chemical Physics, 119(7):3952-3957, Aug. 2003.

International Search Report and Written Opinion mailed on May 3, 2010 for International Application No. PCT/US2009/057567, filed Sep. 18, 2009 (11 pages).

Karp, J.H., et al., "Planar micro-optic solar concentration using multiple imaging lenses into a common stab waveguide," Proceedings of SPIE, High and Low Concentrator Systems for Solar Electric Applications IV, 7407 (1):74070D(1)-74070D(11), Aug. 2009.

King, R "Multijunction Cells: Record Breakers," Nature Photonics, 2(5):284-286, May 2008.

Office Action for Chinese Patent Application No. 200980146342.1, mailed on Jul. 17, 2012 (6 pages).

Tremblay, E.J., et al., "Ultrathin cameras using annular folded optics," Applied Optics, 46(4):463-471, Feb. 2007.

Viravathana, P., at al., "Optical Trapping of Titania/Silica Core-Shelf Colloidal Particles," Journal of Colloid and Interface Science, 221(2):301-307, Jan. 2000.

Watson, E.A., "Analysis of beam steering with decentered microlens arrays," Optical Engineering, 32(11):2665-2670, Nov. 1993.

Yoshida, M., et al., "TiO2 nano-particle-dispersed polyimide composite optical waveguide materials through reverse micelles," Journal of Materials Science, 32(15):4047-4051, Aug. 1997.

Zanzucchi, P.J., et al., "Optical and photoconductive properties of discharge-produced amorphous silicon," Journal of Applied Physics, 48(12):5227-5236, Dec. 1977.

\* cited by examiner

MONOCENTRIC IMAGING

PRIORITY CLAIM AND RELATED PATENT APPLICATION

This patent document claims priority of U.S. provisional application No. 61/471,088 entitled "RADIAL-CONCENTRIC LENS" and filed Apr. 1, 2011, which is incorporated by reference in its entirety as part of the disclosure of this document.

FEDERALLY SPONSORED RESEARCH

This invention was made with government support under grant/contract No. 10-DARPA-1106 awarded by the Defense Advanced Research Projects Agency. The government has certain rights in the invention.

BACKGROUND

This patent document relates to imaging optics, including devices, methods and materials related to developing optical lenses and imagers.

Optical design for imagers can be affected by various characteristics including particular optical performance (e.g., image resolution, image quality, etc.), system cost, power consumption, weight, and physical footprint. Optical systems for providing large pixel counts (e.g., greater than 20 Mega pixels) include complex optics and sizable image sensors that may affect physical factors. Some of the factors in producing high quality images include the size of the imagers used, and the aberrations associated with various optical components.

SUMMARY

The disclosed embodiments relate to methods and systems that enable the capture of very large (e.g., Gigapixel) images with high image quality using optical imaging systems that have a relatively small form factor. The disclosed systems and methods can be manufactured in a cost effective fashion, and can be readily assembled, aligned, tested and utilized in accordance with the disclosed methods.

One aspect of the disclosed embodiments relates to system that comprises a monocentric primary optics section comprising one or more surfaces adapted to form a symmetrical arrangement around a common point of origin. The system also includes a secondary optics module comprising a plurality of secondary optics subsections, where each secondary optics subsection is adapted to intercept at least a portion of light collected by the monocentric primary optics section, and where combination of the primary optics section and the secondary optics section is adapted to form an image. In one example embodiment, the one or more surfaces adapted to form a symmetrical arrangement include a spherical or hemispherical arrangement around the common point of origin.

In one exemplary embodiment, each of the secondary optics subsections fits within a conical volume radiating from the common point of origin of the primary optics section. In another exemplary embodiment, each of the secondary optics subsections is adapted to correct on-axis aberrations produced by the monocentric primary optics section, and each of the secondary optics subsections includes a component that is rotationally symmetric around the optical axis of the corresponding secondary optics subsection. In yet another exemplary embodiment, all of the secondary optics subsections are substantially similar to each other.

According to another exemplary embodiment, individual fields of view of each of the secondary optics subsections can be combined through post-detection processing into a single continuous image covering a wide field of view. In still another exemplary embodiment, the above noted system includes an aperture stop for each combination of the primary optics section-secondary optics subsection, located within each of the secondary optics subsections. According to another exemplary embodiment, at least a portion of the primary optics section provides an optomechanical reference surface for alignment of a secondary optics subsection.

In one exemplary embodiment, the primary optics section of the above noted system comprises substantially spherical or hemispherical elements. In another exemplary embodiment, the secondary optics section comprises a plurality of subsections and each subsection comprises a plurality of lenses. For example, each subsection can include a Cooke triplet. In another example, each subsection can include a field lens and a plurality of secondary lenses. According to another exemplary embodiment, at least a portion the secondary optics section provides mechanical registration of the individual remaining elements of the secondary lens and detector systems.

In one exemplary embodiment, the image is formed at multiple discrete image regions, where each image region corresponds to a field of view captured by a combination of the monocentric primary optics section and a secondary optics subsection. In this exemplary embodiment, the above noted system can also include a plurality of image sensing elements positioned at the multiple discrete image regions and configured to sense images formed at each of the multiple discrete image regions.

Another aspect of the disclosed embodiments relates to an integrated imaging system that includes a monocentric objective, and one or more substantially hemispherical three-dimensional optical components positioned to at least partially surround the monocentric objective. Each of the three-dimensional optical components comprises a plurality of optical elements, and each of the plurality of optical elements is positioned to intercept light collected by the monocentric objective at a particular field of view. The integrated imaging system also includes a plurality of image sensors, wherein each image sensor of the plurality of image sensors is integrated into a corresponding subsection of the WLC optics section.

Another aspect of the disclosed embodiments relates to an integrated imaging system that includes a monocentric objective and a hemispherical three-dimensional field optics section positioned to at least partially surround the monocentric objective. The three-dimensional field optics section includes a plurality of field elements, where each of the plurality of field elements is positioned to intercept light collected by the monocentric objective at a particular field of view. The above integrated imaging system also includes a wafer level camera (WLC) optics section that includes a plurality of subsections, where the WLC optics section is positioned to surround the hemispherical three-dimensional field optics section such that each subsection of the WLC optics section is aligned with a corresponding field element. The integrated imaging system further includes a plurality of image sensors, where each image sensor of the plurality of image sensors is integrated into a corresponding subsection of the WLC optics section.

Another aspect of the disclosed embodiments relates to a method that includes receiving light at a monocentric primary optics section of a monocentric multi-scale imaging device, where the monocentric primary optics section comprises one or more surfaces adapted to form a symmetrical arrangement
} around a common point of origin. The method also includes forming an image using a secondary optics section of the monocentric multi-scale imaging device, where the secondary optics section comprising a plurality of secondary optics subsections, and where each secondary optics subsection is adapted to intercept at least a portion of the light received by the monocentric primary optics section.

DETAILED DESCRIPTION

Figure 1:
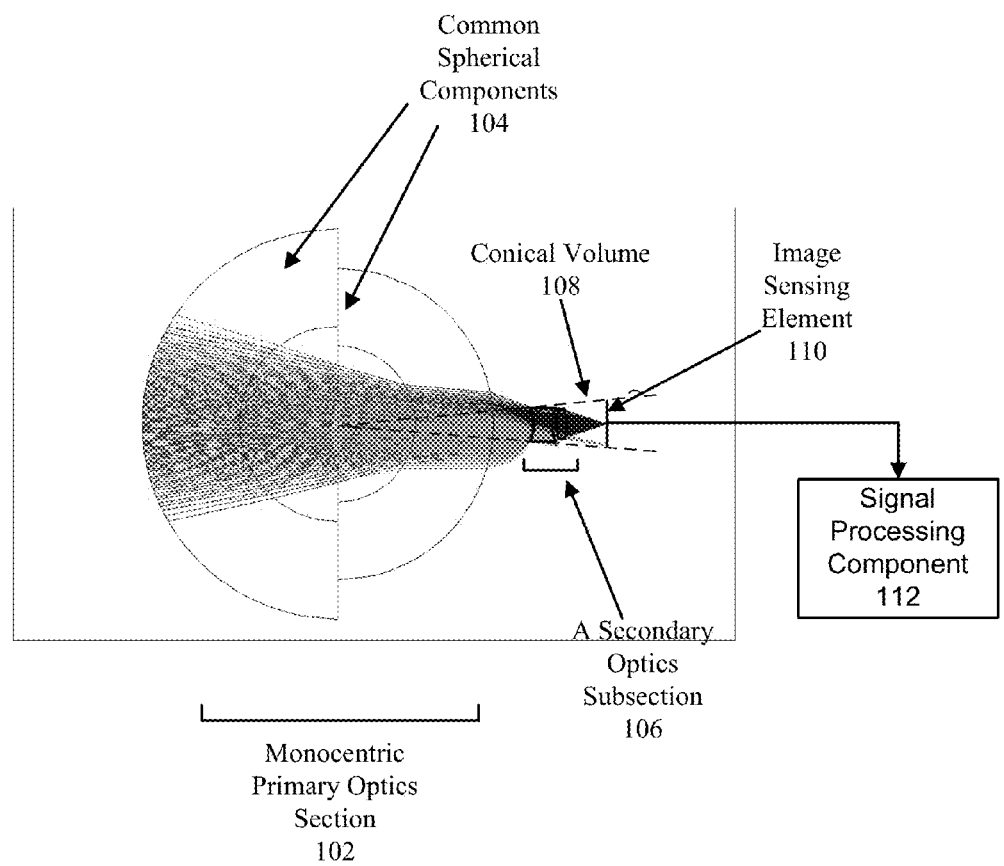
FIG. 1 illustrates a portion of a system for acquiring high-resolution images in accordance with an exemplary embodiment.

Practical implementation of high quality, high-resolution imaging devices is challenging. These challenges are partly due to the expense associated with manufacturing extremely large area image sensors. For example, a large synaptic telescope, with a 3.2 Gigapixel focal plane, which uses 189, 4K by 4K, 10-µm pixel CCDs, with a 9.6-degree field of view over a 640-mm planar image plane, is estimated to occupy 8 cubic meters and cost around $105 Million.

Another challenge is associated with aberration scaling of large image plane lenses. That is, lens aberrations scale with size such that a lens system (e.g., a Cooke triplet) that is diffraction limited at, for example, a focal length of 10 mm can fail when configured to operate at a focal length of 100 mm due to aberrations.

One approach for producing very high-resolution (e.g., Gigapixel) imagers is to utilize a multiple macro-camera array configuration, where a mosaic image can be acquired by a large number of independent cameras. In particular, such a macro-camera array can be arranged to include n independent diffraction limited cameras, each having a focal plane with S pixels. Each camera can be constructed as part of a cylindrical package, where the diameter of the cylinder is the input aperture of the camera, and each camera can produce an independent sample image of the object field. In such a macro-camera array, to acquire high resolution images, the field of view of each independent camera should have minimal overlap with the neighboring cameras. In order to enable capturing higher resolution images using such a macro camera system, the focal lengths of the independent cameras must be increased, resulting in an increased physical volume, weights and the overall cost of the camera array. These costs become prohibitive for practical implementation of very high resolution imagers (e.g., where images in the range of several Gigapixels are needed).

To reduce the cost and size associated with macro-camera arrays, some systems utilize a "multi-scale" lens design that includes a common primary optics section followed by a multiple secondary section. In such multi-scale systems, the primary optics can be curved to minimize aberrations, and the secondary lenses can each be designed to correct the off-axis aberration of the primary lens at an associated field angle. The multi-scale imagers often produce segmented image planes with overlapping images that can be digitally processed and stitched together to produce a single large image. Such a segmented image plane, however, does not require a massive flat focal plane array and, therefore, facilitates the construction of high-resolution imagers with a smaller size. In addition, such multi-scale configurations provide better scaling of aberrations for low F-number Gigapixel imagers.

Nevertheless, practical implementation of such multi-scale imagers is still challenging since the manufacture of free-form (non-rotationally symmetric) aspheric components associated with the secondary optics is not trivial. Further, the lenses in the secondary section (i.e., free-form optical components with no axis of symmetry) must be individually fabricated and positioned with high degree of accuracy in a 3-dimensional space to correct the associated aberration associated with each field angle. As such, each of the image planes may be oriented at a different scale or angle. These and other shortcomings of the multi-scale lens design make it difficult to produce a cost effective imaging system that can be physically scaled to Gigapixel resolution.

The disclosed embodiments relate to methods, devices and systems that can produce extremely high-resolution images while utilizing optical components that can be manufactured and implemented feasibly within a compact imaging system. Such imaging systems can be produced at least in-part by utilizing a primary optics section that is configured to produce the same off-axis aberrations for all field angles. The primary optics section, which provides a common aperture, is radially symmetric and constitutes a monocentric lens. That is, the primary optics section comprises one or more surfaces adapted to form a symmetrical arrangement around a common point of origin. It should be noted that the term lens is used in this document to include a single lens (or a simple lens), as well as a compound lens that includes more than one optical element. In some embodiments, the monocentric lens is comprised of one or more spherical or hemispherical sections with a common center of curvature. Such a monocentric configuration provides a curved image plane and produces identical or nearly identical aberrations at each field angle. It should be noted that the terms spherical and hemispherical are used to convey surfaces or sections that are substantially spherical or hemispherical. For example, the geometry of such surfaces or sections may deviate from a perfect sphere or hemisphere due to manufacturing limitations.

The high-resolution imagers of the disclosed embodiments also include a secondary optics section that is configured to correct residual on-axis aberrations of the monocentric primary optics section that is identical or nearly identical at each field angle. Since the aberrations are on-axis, the secondary optics section can be constructed using rotationally symmetric components (e.g., aspheres) rather than freeform optics used in other multi-scale designs. The use of rotationally symmetric aspheres in the secondary optics section allows using convenient fabrication processes such as some well-established commercial fabrication processes, and facilitates construction of imagers using simple alignment techniques.

In some embodiments, each subsection of the secondary optics section is constrained to fit within a conical volume radiating from the common point of origin of the primary optics section. As such, as long as the secondary optics subsections are constrained within the conical volume, adjacent secondary optics subsections can be added without overlap of the acquired image subsections.

FIG. 1 illustrates a portion of a system for acquiring high-resolution images in accordance with an exemplary embodiment. The monocentric primary optics section 102 includes one or more common spherical optics 104 with a common point of symmetry that in the exemplary configuration of FIG. 1 is located at the center of the monocentric primary optics section 102. FIG. 1 also depicts a secondary optics subsection 106 that is contained within a conical volume 108 radiating from the common point of origin of the primary optics section 102. An image sensing device or element 110 (e.g., a CCD or CMOS imaging sensor element) captures the light that is collected by the combination of primary and secondary optics at a particular field angle (in the exemplary configuration of FIG. 1 only the on-axis conical section is depicted). In implementations, multiple imaging sensors or elements 110 are arranged in an array configuration and are placed at different locations in a symmetrical arrangement around the common point of origin. For example, the multiple imaging sensors or elements 110 can be placed on a curved surface. A circuitry or digital processor within signal processing component 112 can be used to process the outputs from the multiple imaging sensors or elements 110 and to assemble the outputs to form a single composite image. This assembling process can be performed by software.

In some embodiments, the signal processing component 112 include at least one processor and/or controller, at least one memory unit that is in communication with the processor, and at least one communication unit that enables the exchange of data and information, directly or indirectly, through the communication link with other entities, devices, databases and networks. The communication unit may provide wired and/or wireless communication capabilities in accordance with one or more communication protocols, and therefore it may comprise the proper transmitter/receiver antennas, circuitry and ports, as well as the encoding/decoding capabilities that may be necessary for proper transmission and/or reception of data and other information.

Figure 2:
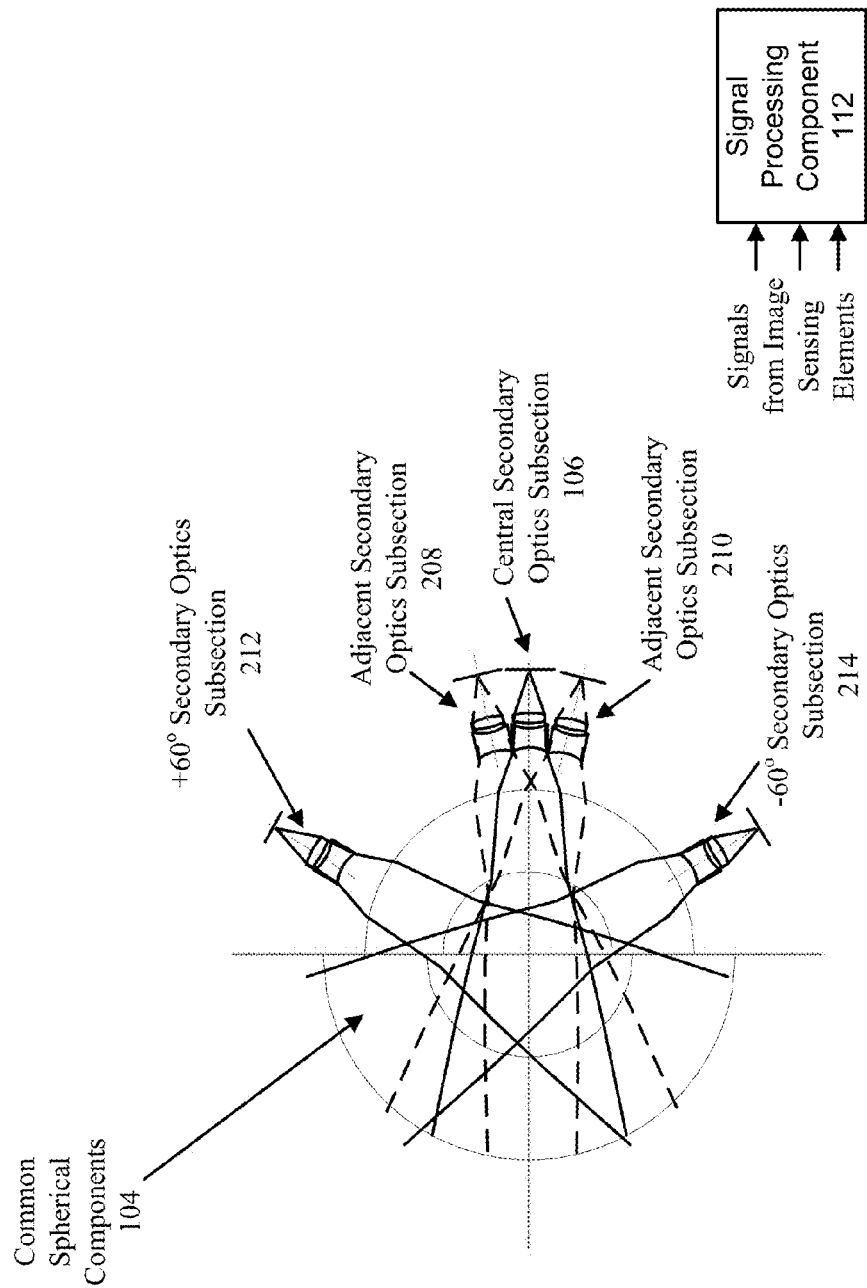
FIG. 2 illustrates additional portions of the system that is depicted in FIG. 1.

FIG. 2 illustrates additional portions of the system that is depicted in FIG. 1. In particular, the central secondary optics subsection 106 is depicted along with two adjacent (and physically non-overlapping) secondary optics subsections 208, 210, as well as +60 degrees and −60 degrees secondary optical subsections 212, 214. Additional secondary optics subsections (i.e., sub-imagers) can be added as needed to acquire images for a given desired field of view. The optical design of the secondary optics should preferably provide overlapping fields of view, so that images acquired by adjacent secondary optics paths can be combined to provide a seamless composite image. Such combination can be carried out at least in-part using signal processing component 112. In the exemplary configuration of FIG. 2, all secondary optics subsections can be substantially similar to one another (and to the central secondary optics subsection 106) with substantially similar focal planes. Therefore, the high-resolution imaging system of FIG. 2 can be mass produced at a lower cost compared to the previously discussed multi-stage imagers, and can be assembled with relatively ease due to its generous alignment tolerances. It should be noted that the plurality of secondary optical subsections have been described as being substantially similar to one another. Such a characterization accounts for imperfections is optical materials, variability in manufacturing process and other sources of variations that are present in most, if not all, practical manufacturing and assembly processes.

Figure 3:
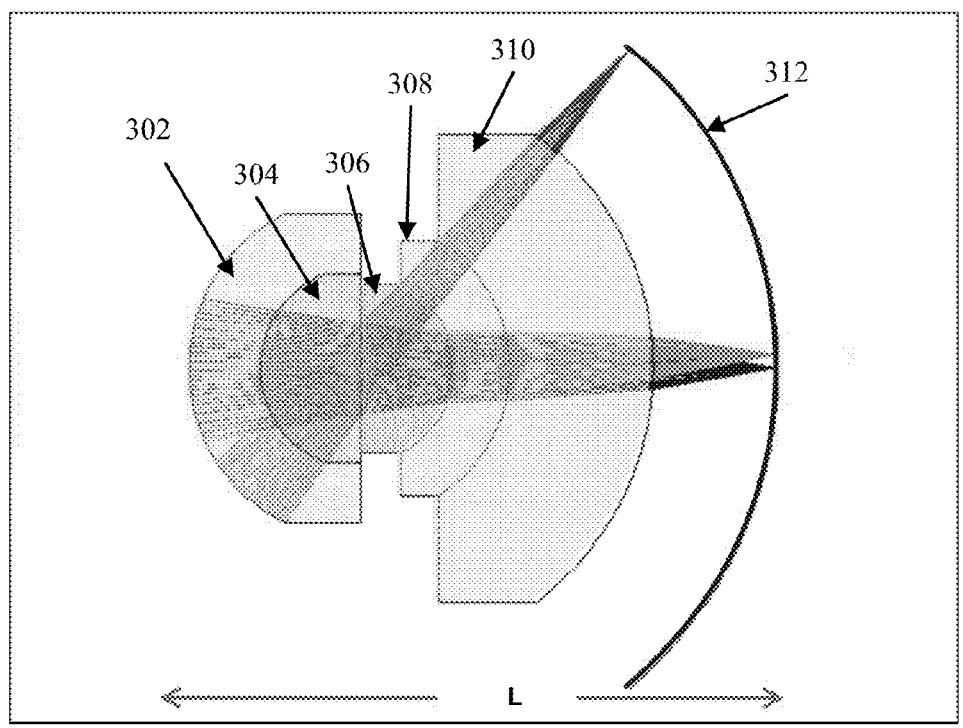
FIG. 3 illustrates a monocentric primary optics section in accordance with an exemplary embodiment.

FIG. 3 illustrates a monocentric primary optics section in accordance with an exemplary embodiment. The exemplary monocentric primary optics section of FIG. 3 includes 5 elements 302, 304, 306, 308, 310 with a curved focal plane 312. In one exemplary embodiment, the exemplary monocentric primary optics section of FIG. 3 has an F-number of 3, an effective focal length of 223 mm, a full filed of view of 100 degrees, and the length of 317 mm. The length total length, L, is 339 mm. In one exemplary embodiment, the five elements of the monocentric primary optics section are constructed from the following glass material: H-LAK4L, N-PK51, PK51A, H-ZLAF68 and KZFSN5. The exemplary monocentric primary optics section of FIG. 3 is capable of providing up to 10 Gigapixel images over a 100-degrees field of view.

Figure 4:
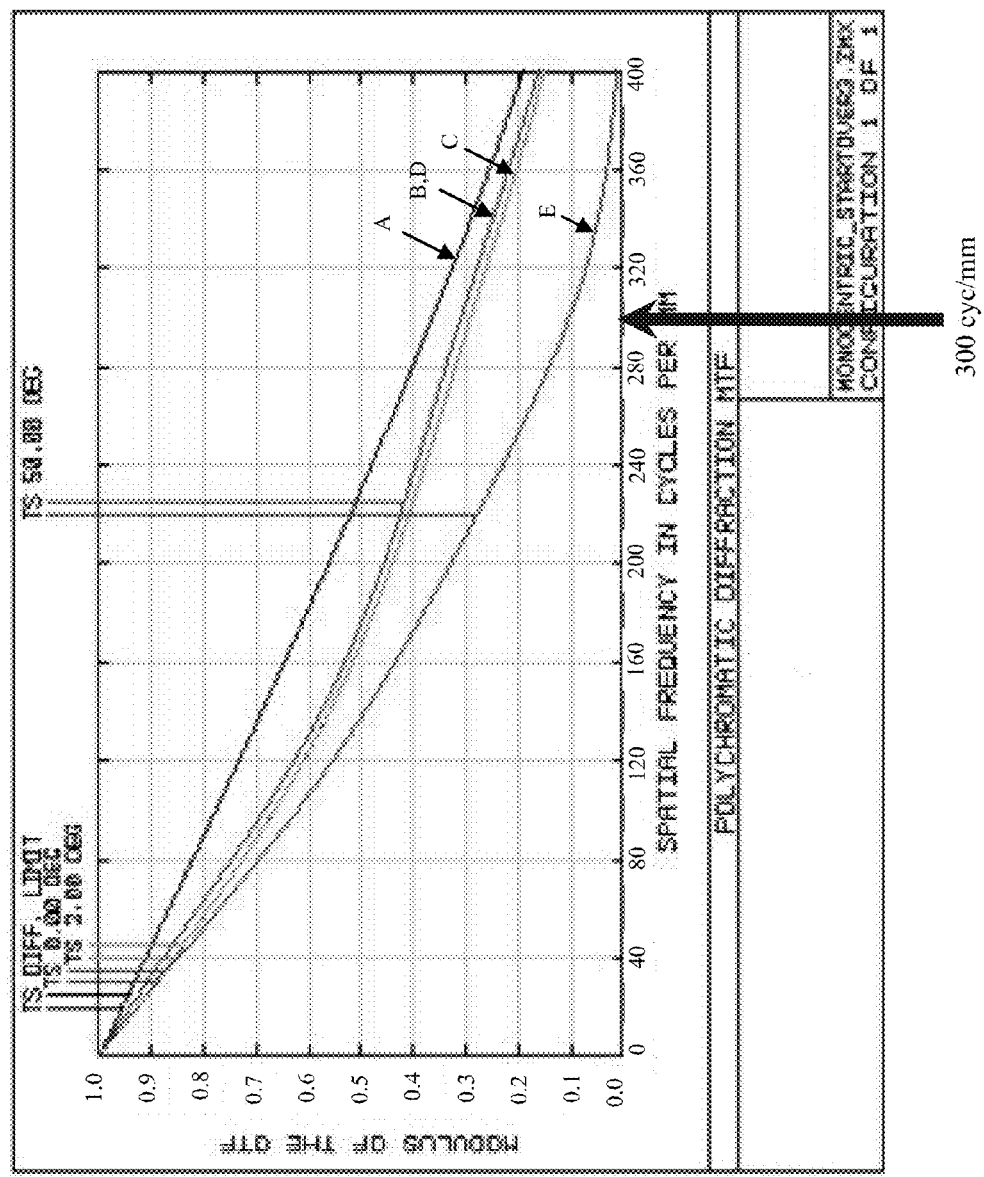
FIG. 4 is a diagram illustrating the modulus of the optical transfer function (OTF) versus spatial frequency in cycles per millimeter for the exemplary monocentric primary optics section of FIG. 3.

FIG. 4 is a diagram illustrating the modulus of the optical transfer function (OTF) versus spatial frequency (in cycles per millimeter) for the exemplary monocentric primary optics section of FIG. 3. The Nyquist resolution for 1.67-μm pixels occurs at about 300 cycles/mm, as indicated by the thick arrow in FIG. 4. The non-zero OTF value at 300 cycles/mm indicates that image data can be collected at such a resolution. Since the monocentric optics section is symmetric, the image resolution illustrated in FIG. 4 is achieved for the full degrees of field of view (e.g., for the entire 100-degree field of view). In FIG. 4, the line labeled as A corresponds to the diffraction limit of the aperture, viewed at normal incidence. The line labeled as B and line labeled as C correspond to the modeled spatial resolution obtained for light entering the lens at 2 and 0 degrees off normal. The lines labeled as D and E correspond to the modeled spatial resolution obtained at 50 degrees off normal. Further, the lines labeled with T and S correspond to tangential and sagittal plots. The resolution of the sagittal is reduced due to the partial obscuration of the aperture when viewed at an angle. This is an indication of the reduction in achievable resolution when using a conventional aperture in the primary lens, as opposed to each of the secondary lens systems.

To facilitate the sensing of high-resolution images produced by the monocentric primary optics section, secondary sub-imagers are introduced that, in some embodiments, function as relay imaging devices to convey discrete patches of the curved image formed by the monocentric primary lens onto spatially separate (and flat) focal planes. This way, discrete focal plane arrays can be used with sufficient spacing between individual array elements to allow for packaging and electrical connections. More generally, and as shown in FIG. 1 and FIG. 2, in configurations that the primary lens alone does not form a focused image, the combination of the primary lens and one of the secondary optics subsections form an image on each of the focal plane arrays, where each image corresponds to an overlapping region of the overall field of view.

Figure 5:
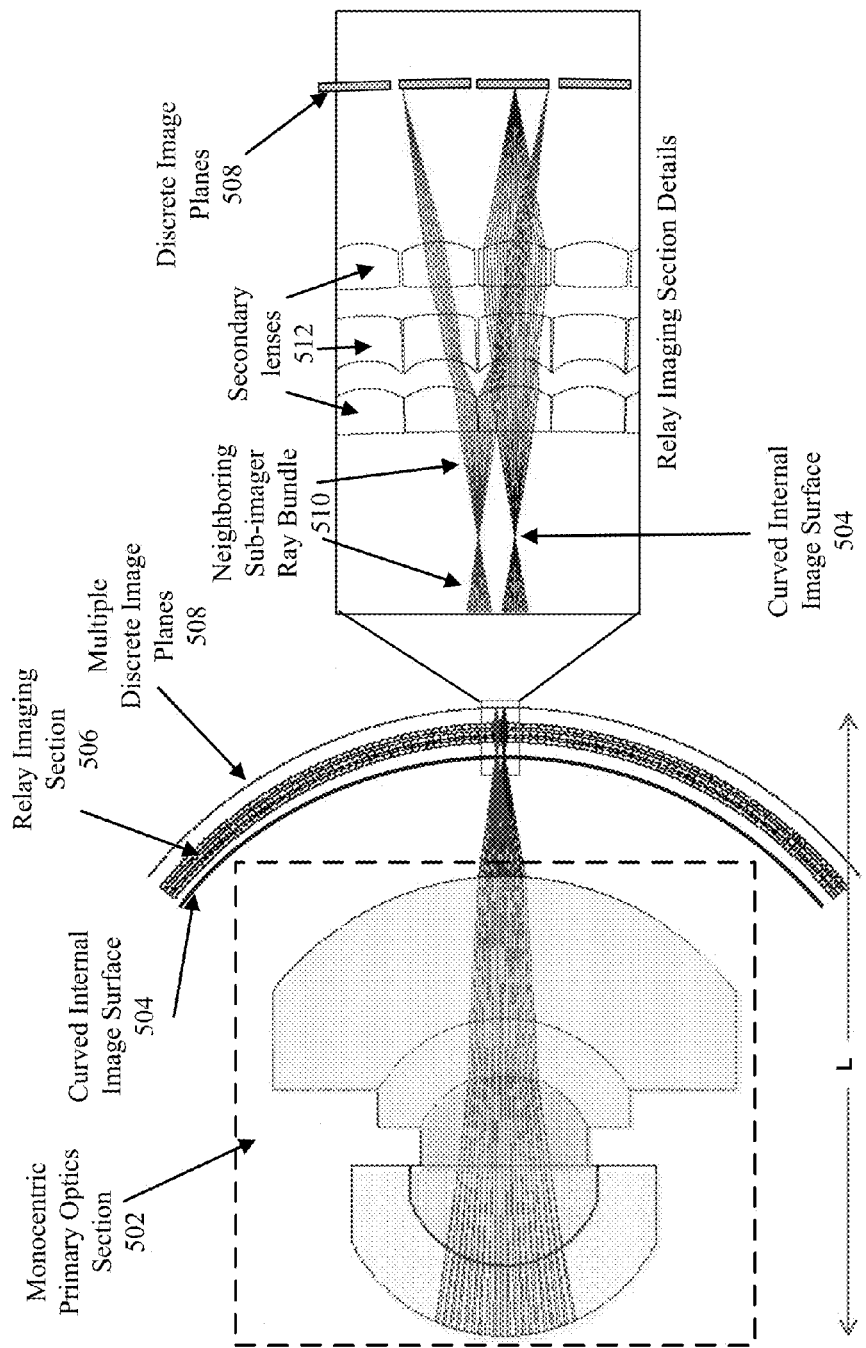
FIG. 5 illustrates a monocentric multi-scale camera in accordance with an exemplary embodiment.

FIG. 5 illustrates a monocentric multi-scale camera in accordance with an exemplary embodiment. The monocentric primary optics section 502 and the associated curved internal image surface 504 are similar to those depicted in FIG. 3. In the specific example embodiment shown in FIG. 5, the secondary optics section is depicted as including a relay imaging section 506 (that can include triplet secondary lenses 512). The relay imaging section 506 corrects the aberrations associated with the monocentric primary section 502 and relays the primary optics section's intermediate image to multiple discrete image planes 508 or image regions. FIG. 5 also shows the neighboring sub-imager ray bundle 510 from intermediate image field points that is imaged onto two adjacent focal planes, allowing for sub-images to be stitched into a single seamless image. In some embodiments, there may be no internal image plane, as the secondary optics may act to form the image.

In various implementations, some image field overlap between the adjacent sub-imager optics is useful to provide a continuous field of view, but this overlap should be limited in certain implementations. An image field overlap between adjacent sub-imagers optics can result in sharing of light between two or more focal planes. This sharing tends to reduce image brightness, and can cause additional diffraction and corresponding loss in the maximum achievable resolution. As a result, even for ideal optical systems, image pixels formed in overlap regions may have a lower intensity and resolution. Additionally, degenerate image areas, where the same object is imaged to multiple image planes, generate redundant information and, in general, reduce the total effective pixel count compared to total number of image sensor pixels. For these and other reasons, techniques are provided in this disclosure to reduce or eliminate image field overlap between adjacent sub-imagers optics.

Figure 6:
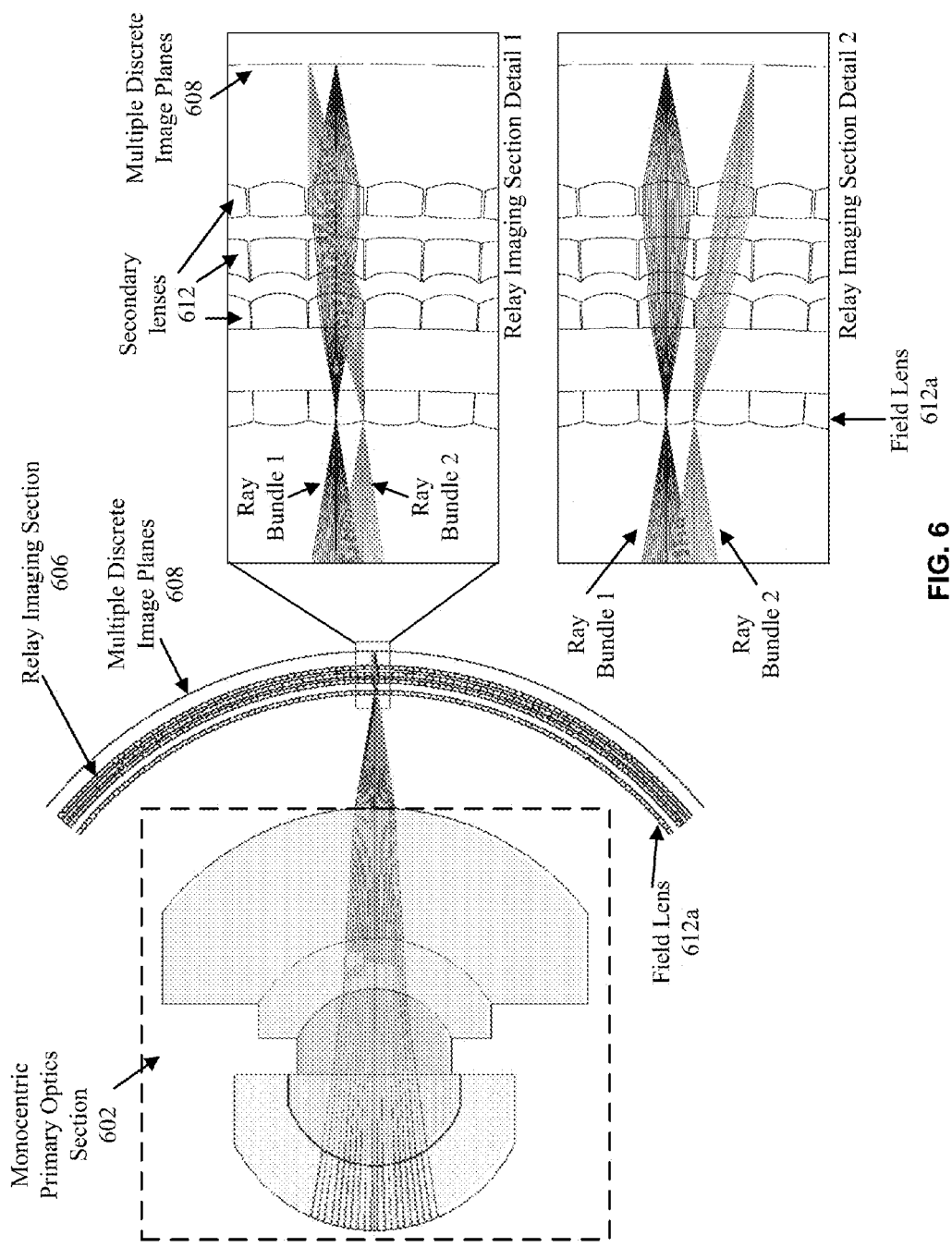
FIG. 6 illustrates a monocentric multi-scale camera in accordance with an exemplary embodiment that includes one or more field lenses near the internal image plane.

FIG. 6 illustrates a monocentric multi-scale camera in accordance with an exemplary embodiment that 6 reduces or eliminates the sharing of light between two or more focal planes. Similar to the exemplary embodiment of FIG. 5, the monocentric primary optics section 602 produce images on a curved image surface (not explicitly labeled). Compared to FIG. 5, however, the secondary optics section includes not only the relay optics section 606 but also an a additional series of field lenses 612a that are positioned at the curved image surface of the monocentric primary optics section 602. The exemplary configuration of FIG. 6 that includes the field lenses 612a mitigates, at least in-part, the problems associated with sharing of light between adjacent sub-imagers. To this end, the field lenses 612a tilt the incident light into one or the other sub-imager paths and, therefore, maintain substantially constant brightness and diffraction limit to resolution at the edges of the sub-imager field. In FIG. 6, the relay imaging section detail 1 illustrates an exemplary scenario where the field angle is just below the crossover point such that ray bundle 1, as well as ray bundle 2 are collected by the central image plane of the multiple discrete image planes 608 (or image regions). In relay imaging section detail 2, the field angle is just above the crossover point such that ray bundle 2 is collected by an adjacent image plane of the multiple discrete image planes 608. To enhance the quality of captured images, in one exemplary embodiment, the field lenses 612a can be fabricated with sharp edges with a transition on the order of one pixel or less.

Figure 7:
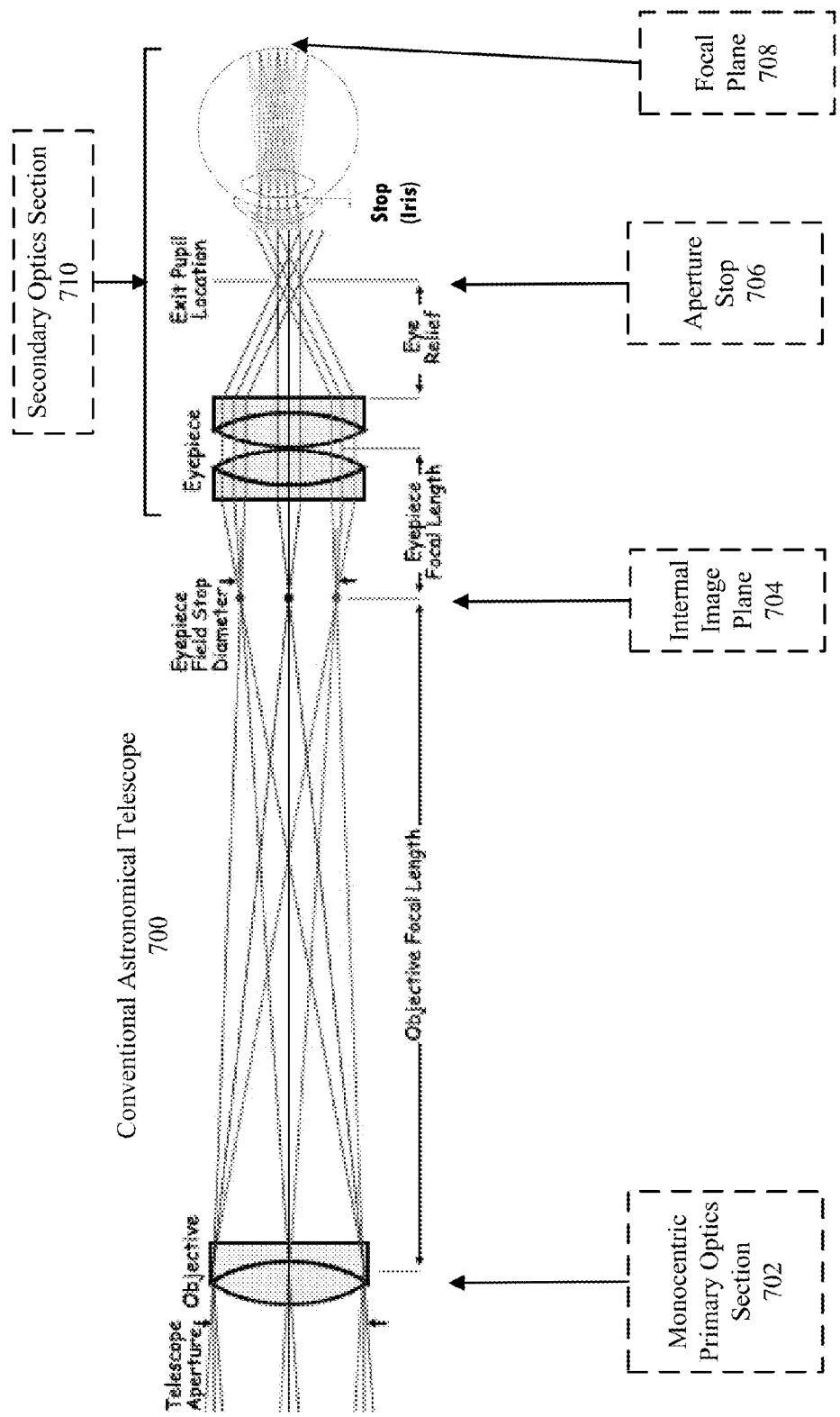
FIG. 7 schematically compares an astronomical telescope with a monocentric multi-step camera that is constructed in accordance with an exemplary embodiment.

Imaging system designs that obey the above-described symmetry constraint of a monocentric objective lens having the secondary optics that fit within a conical volume radiating form the same central point of symmetry may be divided in two major categories: those that do not have an internal image plane (as shown in FIG. 1 and FIG. 2) and those with an internal image plane (as illustrated in the exemplary embodiment of FIG. 3). If the monocentric primary optics section creates a focus for incident light, and the design locates the secondary optics beyond that focal plane, the overall optical structure can be compared to an astronomical telescope that similarly produces an internal image plane. Such an astronomical telescope 700 is illustrated in FIG. 7, with the corresponding components of a monocentric multi-scale camera labeled in dashed boxes around the telescope 700. The monocentric primary optics section 702 can be located at a similar location as the telescope's objective, and the secondary optics section can be assumed to replace the components that include the eyepiece and the eye, thereby positioning the focal plane 708 at the position of eye's retina. An internal aperture stop 706 can be located at the exit pupil of the telescope's eyepiece, within the secondary optics section 710. The use of the aperture stop 706 to restrict the on-axis light blocks a portion of the aberrated rays that are produced by the monocentric primary optics section 702. It also allows for a highly uniform image across the image field of each individual imager's image plane, and between the image planes at different field angles of the monocentric multi-scale imaging system.

Figure 8:
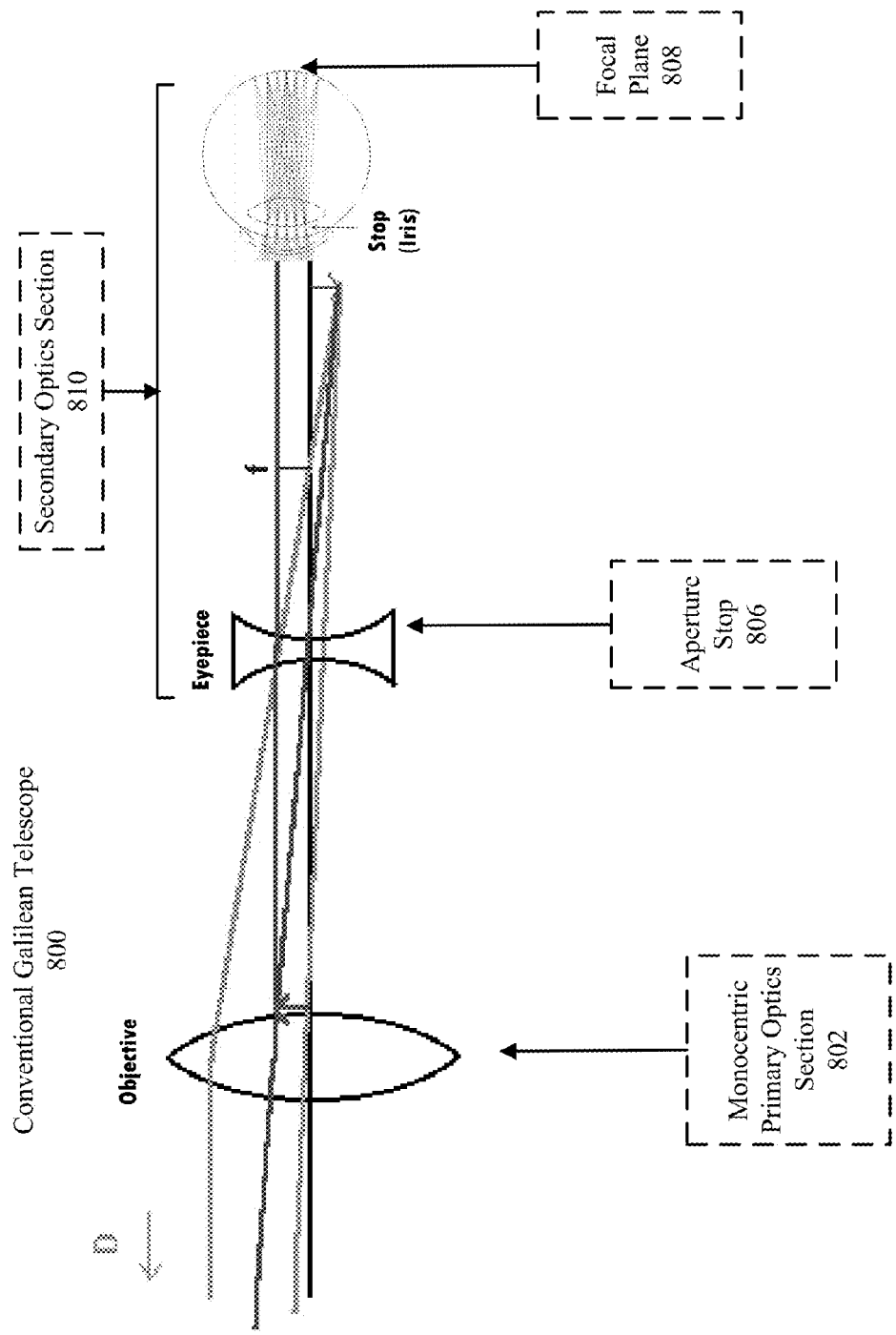
FIG. 8 schematically compares an Galilean telescope with a monocentric multi-step camera that is constructed in accordance with an exemplary embodiment.

Imaging systems where either the monocentric primary optics section does not create a focus for incident light, or where the design locates the secondary optics before the focus is reached, can be compared to a Galilean telescope. Such a Galilean telescope 800 is illustrated in FIG. 8, with the corresponding components of a monocentric multi-scale camera illustrated in dashed boxes around the telescope 800. The monocentric primary optics section 802 can be located at a similar location as the telescope's objective, with the secondary optics section replacing the components that include the eyepiece and the eye, thereby positioning the focal plane 808 at the position of eye's retina. The entrance of the secondary optics can act as the aperture stop 806 to block highly aberrated rays from the monocentric lens.

Figure 9:
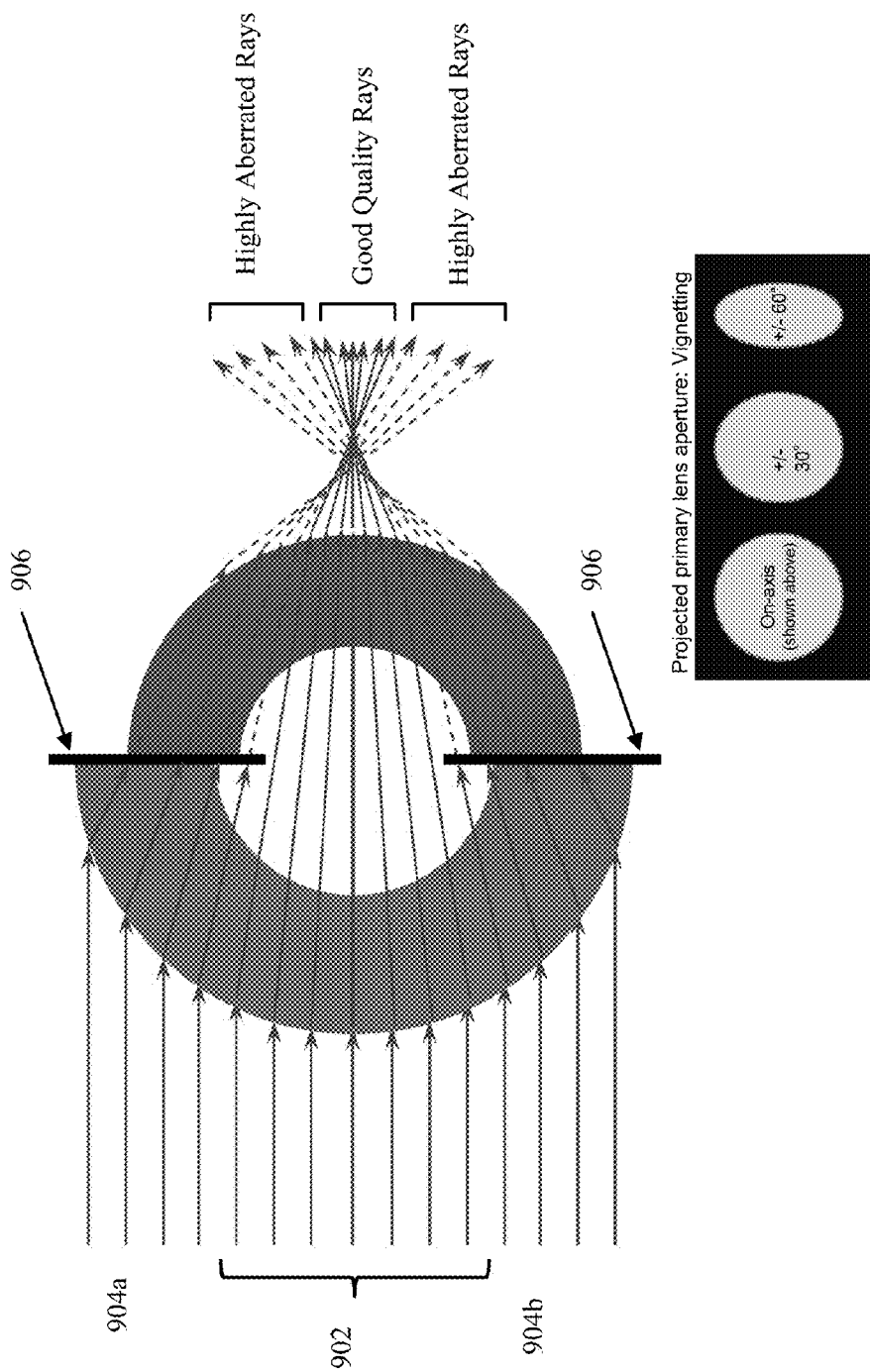
FIG. 9 illustrates a primary optics section that is configured to reduce on-axis aberrations in accordance with an exemplary embodiment.

To limit on-axis aberrations, additionally or alternatively, a stop, such as a circular obscuration, can be placed within the components of the monocentric primary optics section. FIG. 9 illustrates one configuration for that is adapted to reduce on-axis aberrations in accordance with an exemplary embodiment. The rays 902 that are incident upon the central portion of the monocentric primary optics section include no or little aberration and, therefore, tend to form a reasonably good image, especially when any residual aberrations are subsequently corrected by the secondary optics section of the imaging system. However, the rays 904 that are incident upon the outer portions of the monocentric primary optics section produce highly aberrated images that are hard to correct with the secondary optics section of the imaging system. Therefore, in some embodiments, an aperture stop 906 is placed at the central location of the monocentric primary optics section to block the ray 904b that are far from the axis of symmetry.

The configuration that is depicted in FIG. 9 works well for the on-axis sub-imager section of the monocentric multi-scale imager, as well as for a limited number of additional sub-imagers around the on-axis sub-imager. However, for sub-imagers that are associated with larger fields of view, vignetting (i.e., loss of light due to blockage by the stop 906) and diffraction can occur. An exemplary vignetting scenario is shown in lower section of FIG. 9, where the aperture appears round for the on-axis sub-imager, but sub-imagers that view the primary lens aperture stop at larger angles (e.g., at ±30 degrees or ±60 degrees) see a tilted ellipse. The resulting vignetting can cause significant diffraction effects. Therefore, instead of using an aperture stop within the monocentric primary section, for monocentric multi-scale imagers that require a large field of view, aberrations can be corrected using the secondary optics section, as was described, for example, in connection with FIGS. 7 and 8. Additionally, in some embodiments, to limit scattered stray light within the optical system, an oversized aperture stop in the primary optic can be used to block some of the stray light intensity, while the actual system aperture stops can be located in each of the secondary optics.

The monocentric multi-scale imaging system of the disclosed embodiments enable the capture of very high resolution images at a much smaller form factor than the conventional systems that, for example, use multiple macro-camera arrays. The following computations illustrates how the volume of a macro-camera array can be estimated. In the following analysis, the incoherent cutoff spatial frequency (cycles/mm) is given as $$f_c = \frac{1}{\lambda N},$$

where $\lambda$ is the wavelength of incident light and N is the F-number. The Nyquist frequency (cycles/mm) for pixel pitch, p (mm), is $f_N = 1/2\, p$. When Nyquist frequency matches the diffraction limited cutoff frequency, the maximum F-number becomes $$N_{max} = \frac{2p}{\lambda}.$$

To produce G total pixels, the number of focal plane arrays (FPAs), each having S pixels, that must be used can be computed as $$n = \sqrt{\frac{G}{S}}.$$

For an FPA with a diagonal dimension, $\phi_s$, the size of the montage image diagonal (excluding any spaces) is given by $$\sqrt{2n^2}\,\varphi_S = \sqrt{\frac{2G}{S\varphi_S}}.$$

The field of view per sensor, $FOV_S$, can be computed from the total field of view, $FOV_T$, according to $$FOV_S = \frac{FOV_T}{\sqrt{2G/S}},$$

which makes the focal length required for each camera element $$F = \frac{\varphi_S}{2\tan\left(\frac{FOV_T}{2\sqrt{2G/S}}\right)}.$$

Assuming a cylindrical camera geometry, the diameter of each camera is D=F/N. Based on the above analysis, the total volume of a multiple camera array imaging system can be estimated as:

$$\text{Volume}_{Array} = \text{Area} \cdot \text{thickness} \approx n^2 D^2 F = \frac{\varphi_S G}{8SN^2 \tan^3\left(\frac{FOV_T}{2\sqrt{2G/S}}\right)}. \quad (1)$$

Figure 10:
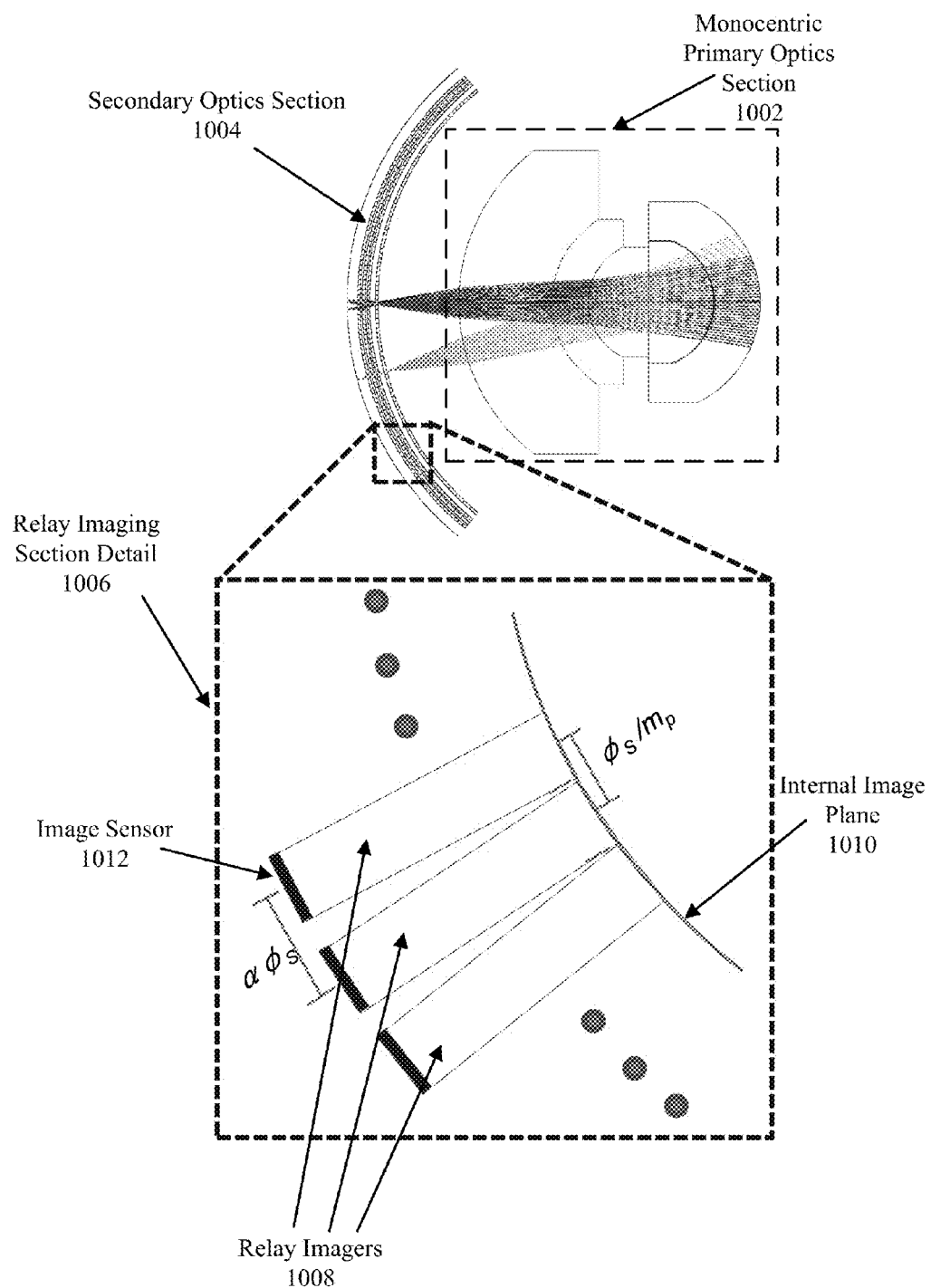
FIG. 10 illustrates an exemplary configuration of a portion of monocentric multi-scale camera in accordance with an exemplary embodiment.

Analogous computations can be carried out for a monocentric multi-scale camera that is designed in accordance with the disclosed embodiments. In particular, it is assumed that the same Gigapixel mosaic as the multiple macro-camera array is obtained using a shared monocentric primary optics section with a square array of n diffraction limited relay imagers, resolving S pixel focal planes. Further, it is assumed that each relay imager comprises a cylindrical package that independently samples the image plane produced by the monocentric primary optics section. FIG. 10 illustrates an exemplary configuration of a portion of monocentric multi-scale camera in accordance with an exemplary embodiment that can facilitate the understanding of the following analysis. In FIG. 10, the monocentric primary optics section 1002 and the secondary optics section 1004 are similar to those illustrated in FIG. 5. The relay imaging section detail 1006 more clearly depicts the components within the secondary optics section 1004, including the relay imagers 1008 that relay the image from the internal image plane 1010 to the image sensors 1012. For conducing the volume computations that follow, the relay imagers 1008 are assumed to have a cylindrical shape.

Similar to the analysis carried out for the multiple camera array, when Nyquist frequency matches the diffraction limited cutoff frequency, the maximum F-number becomes $$N_{max} = \frac{2p}{\lambda}.$$

Assuming the collector primary optics section has a spherical image plane with arc length $$D_{collector} = \sqrt{\frac{2G}{S}} \frac{\varphi_S}{m_p},$$

radius of collector's image becomes $$r_{collector} = \frac{D_{collector}}{\frac{\pi FOV_T}{180}} = \frac{180\sqrt{\frac{2G}{S\varphi_S}}}{\pi m_p FOV_T},$$

where $\phi_S$ is the individual sensor's diagonal size and $m_p$ is the relay magnification, which is typically less than 1. From monocentric geometry, radius of the processed image plane (i.e., the image plane at the image sensors) is $r_{processed} = \alpha m_p r_{collector}$, where $\alpha$ is the lateral separation of the relay imagers. Solid angle volume of spherical section of angle $FOV_T^2$ is $$V = \frac{FOV_T \pi}{540}[1 - \cos(FOV_T)],$$

and the volume of the monocentric multi-scale camera (MMC) imaging system in mm³ can be computed as: $\text{Volume}_{MMC} = \text{Volume}_{center\ to\ collector\ lens\ front} + \text{Volume}_{center\ to\ processed\ image}$. Equation (2) then provides an estimate for volume of the monocentric multi-scale camera in mm³:

$$\text{Volume}_{MMC} = \frac{10800\left(\frac{2G}{S}\right)^{\frac{3}{2}} \varphi_S^3}{\pi^2 m_p^3 FOV_T^2}[1 - \cos(FOV_T)](\beta_{LF}^3 + \alpha^3 m_p^3). \quad (2)$$

In Equation (2), $\beta_{LF}$ is the primary optics section's front radius (or collector image radius). As evident from Equation (2), the volume of a monocentric multi-scale camera that is designed in accordance with the disclosed embodiments does not depend on the F-number. Using Equations (1) and (2), for an F/3, 50-Gigapixel imaging system, with a 120-degree field of view that uses 1.67-µm pixel pitch 10-Megapixel FPAs, the volume associated with a multiple macro-array camera system is 27 m³, whereas the volume for a monocentric multi-scale imager of the disclosed embodiments is 0.37 m³.

Figure 11:
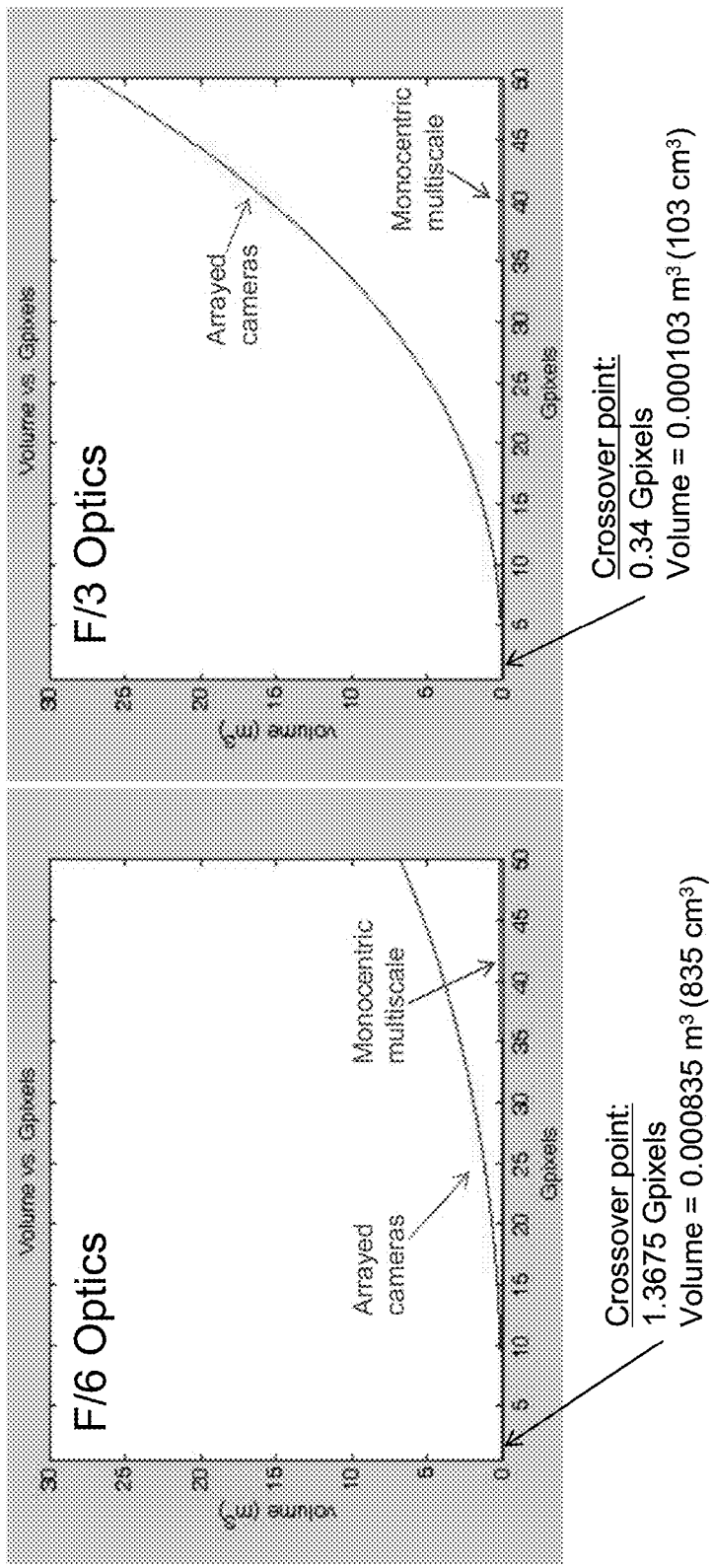
FIG. 11 illustrate plots of volume versus Gigapixel for a multi-camera macro-camera array and a monocentric multi-scale imaging system of an exemplary embodiment.

FIG. 11 illustrate plots of volume versus Gigapixel for a multi-camera macro-camera array (i.e., "arrayed camera") and a monocentric multi-scale imaging system of the disclosed exemplary embodiments at F/6 and F/3. As evident from FIG. 11, the monocentric multi-scale imaging systems of the disclosed embodiments provide a significant advantage in terms of volume over the conventional arrayed camera systems, especially at lower F-numbers. In general, lower F-number optics allow shorter exposures or produce less noisy images. However, these advantages come at a higher cost and complexity.

Figure 12:
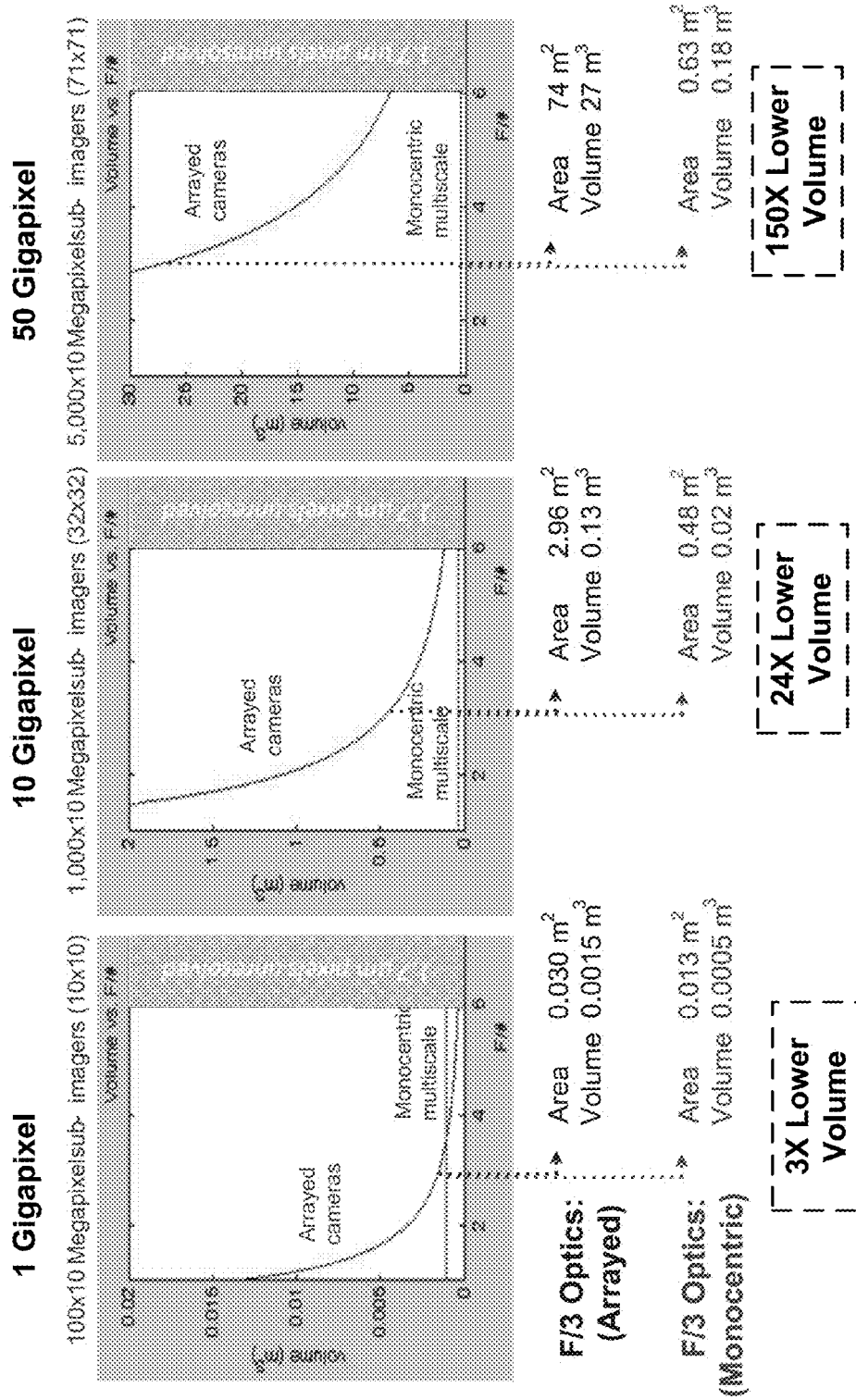
FIG. 12 illustrates plots of volume versus F-number for a multi-camera macro-camera array and a monocentric multi-scale imaging system of an exemplary embodiment.

FIG. 12 shows volume versus F-number for a multi-camera macro-camera array (i.e., "arrayed camera") and a monocentric multi-scale imaging system of an exemplary embodiment for 1-, 10- and 50-Gigapixel imaging systems. As evident from FIG. 12, the volume of the monocentric multi-scale imaging system of the disclosed embodiments remains quite small even when the number of Gigapixels increases, whereas for very large pixel counts, the volume of arrayed camera systems becomes unmanageably large. Compared to an arrayed camera system, the monocentric imaging devices of the disclosed embodiments provide a 3×, 24× and 150× volume advantage for 1-, 10- and 50-Gigapixel imagers, respectively, at F/3.

Figure 13:
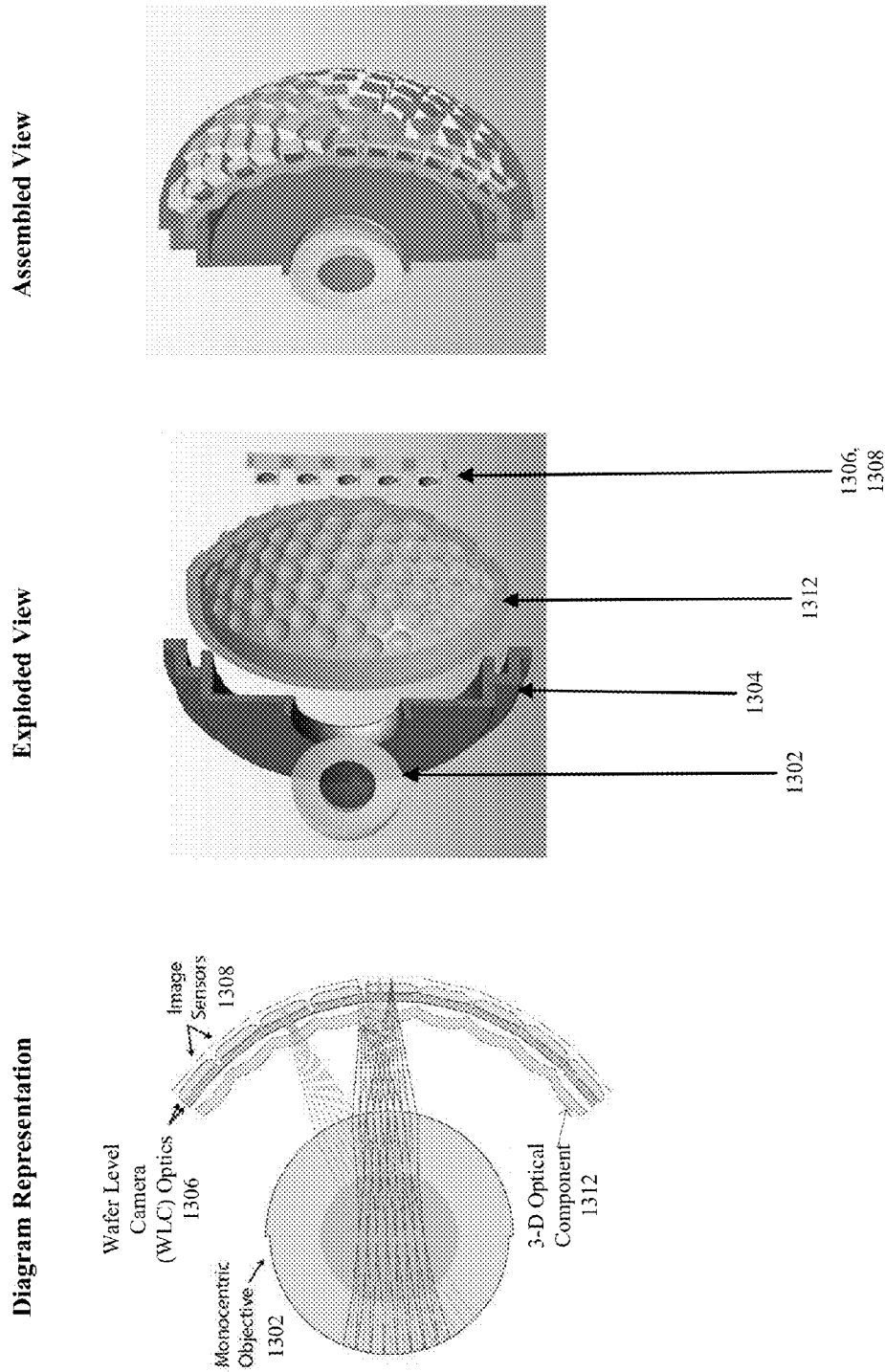
FIG. 13 illustrates a diagram representation, an exploded view and an assembled view of an integrated monocentric multi-scale imaging system in accordance with an example embodiment.

Recognizing that handling a large quantity of individual lens systems can become expensive, advanced optical fabrication and assembly techniques can be used to facilitate the implementation and integration of a monocentric multi-scale imaging systems. Such techniques can be used for cost reduction, and also to enable the production of miniaturized versions of the monocentric multi-scale imaging. FIG. 13 illustrates a diagram representation, an exploded view and an assembled view of an integrated monocentric imaging system in accordance with an example embodiment. The monocentric objective 1302, which forms the monocentric primary optics section of the imaging system can, for example, be molded or polished using conventional lens fabrication techniques. As depicted in the exploded view of FIG. 13, the integrated monocentric imaging system can include a mechanical housing 1304 that can provide an indirect mechanical registration mechanism for the monocentric objective 1302. A 3-Dimensional optical component 1312 (i.e., the first element of the secondary optics section) can also provide a mechanical registration surface for the other components of the secondary optics section, such as the wafer level camera (WLC) optics 1306 assemblies, and directly or indirectly, for the monocentric objective 1302, as well. In some embodiments, includes field optics. In one example embodiment, the 3-D field optical component 1312 is a faceted hemispherical 3-D optical element that is fabricated using direct step-and-repeat single point diamond turning of an optical material (e.g., plastic). Additionally or alternatively, the same step-and-repeat can be used to it create a mold for making multiple copies of the 3D optic. Similarly, a multi-lens secondary optical system can be constructed from a set of multiple substantially concentric 3-Dimensional optical and mechanical elements, each a faceted hemispherically shaped component, so that an image can be formed on multiple focal plane arrays attached to the outer element that includes the image sensors 1308.

Referring again to FIG. 13, the remaining components of the secondary optics section (e.g., WLC optics 1306 and image sensor 1308) can be fabricated as WLC, and mounted on electrical connectors. The use of wafer level camera technology allows the lens elements, filters, sensors, as well as electrical and electronic components (e.g., processors), to be included in a small, integrated package, which provides cost savings and implementation advantages. For example, planar optical components, such as lenslets and aperture arrays, can be integrated onto a silicon CMOS chip with multiple image sensors, which are then diced into individual optoelectronic assemblies. For cameras that are integrated into mobile devices, such assemblies can be complete imaging systems. Such assemblies can also be used in combination with a monocentric primary optics section to form a multi-scale imaging system.

In one exemplary embodiment, an integrated imaging system can be provided that includes a monocentric objective, and a hemispherical three-dimensional field optics section that is positioned to at least partially surround the monocentric objective. The three-dimensional field optics section can include a plurality of field elements, where each of the plurality of field elements is positioned to intercept light collected by the monocentric objective at a particular field of view. Such an integrated imaging system also includes an integrated wafer level camera (WLC) optics section that comprises a plurality of subsections, where the WLC optics section is positioned to surround the hemispherical three-dimensional field optics section such that each subsection of the WLC optics section is aligned with a corresponding field element. The integrated imaging system further includes a plurality of image sensors, wherein each image sensor of the plurality of image sensors is integrated into a corresponding subsection of the WLC optics section.

Figure 14:
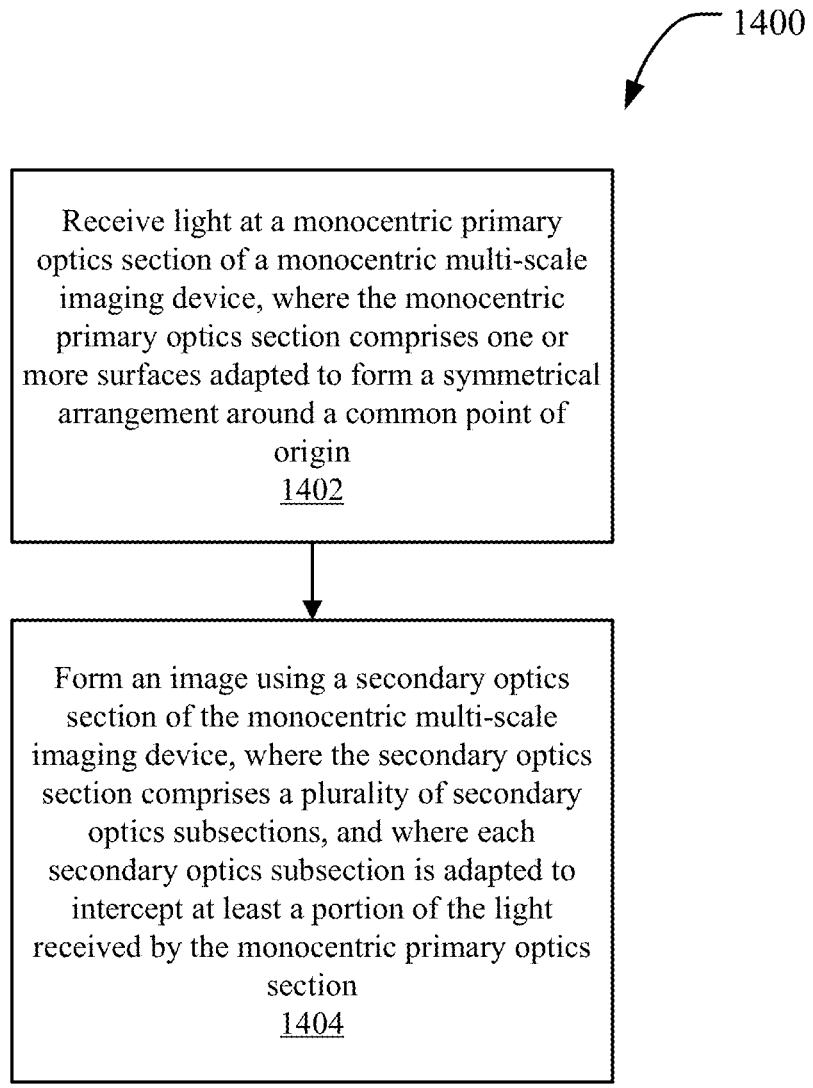
FIG. 14 illustrates a set of operations that can be carried out to form an image in accordance with an exemplary embodiment.

FIG. 14 illustrates a set of operations 1400 that can be carried out to form an image in accordance with an exemplary embodiment. At 1402, light is received at a monocentric optics section of a monocentric multi-scale imaging device, where the monocentric primary optics section comprises one or more surfaces adapted to form a symmetrical arrangement around a common point of origin. At 1404, an image is formed using a secondary optics section of the monocentric multi-scale imaging device, where the secondary optics section comprises a plurality of secondary optics subsections, and where each secondary optics subsection is adapted to intercept at least a portion of the light received by the monocentric primary optics section.

In one exemplary embodiment, each of the secondary optics subsections fits within a conical volume radiating from the common point of origin of the primary optics section. Further, each of the secondary optics subsections is adapted to correct on-axis aberrations produced by the monocentric primary optics section, and each of the secondary optics subsections includes a component that is rotationally symmetric around the optical axis of the corresponding secondary optics subsection. In some embodiments, all of the secondary optics subsections are substantially similar to each other. In further exemplary embodiments, forming an image according to the method that is described in FIG. 14 comprises combining a plurality of individual images produced by the secondary optics subsections into a single image. In one example, the combining is carried out through post-detection processing and the single image is a continuous image covering a wide field of view.

In some exemplary embodiments, an aperture stop is provided for each combination of the primary optics section-secondary optics subsection within the secondary optics subsection of the monocentric multi-scale imaging device. Moreover, a secondary optics subsection can be aligned using at least a portion of the primary optics section as an optomechanical reference surface. Such an alignment can be done prior to using the multi-scale imaging device or as necessitated, if and when misalignment of the components occur.

As noted earlier, in some embodiments, the primary optics section comprises spherical or hemispherical elements. The secondary optics section can include a plurality of subsections and each subsection can include a plurality of lenses. For example, each subsection comprises a Cooke triplet. In some embodiments, each subsection comprises a field lens and a plurality of secondary lenses.

In certain exemplary embodiments, at least a portion the secondary optics section provides mechanical registration of the individual remaining elements of the secondary lens and detector systems. In another exemplary embodiment, forming an image based on the operations that are described in FIG. 14 includes producing multiple discrete images, where each of the multiple discrete images corresponds to a field of view of the monocentric multi-scale imager captured by a combination of the monocentric primary optics section and a secondary optics subsection. The exemplary operations of FIG. 14 can also include sensing each of the multiple discrete images using image sensing elements positioned at the multiple discrete image locations.

Various embodiments described herein are described in the general context of methods or processes, which may be implemented, at least in part, by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), Blu-ray Discs, etc. Therefore, the computer-readable media described in the present application include non-transitory storage media. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A system, comprising:
a monocentric primary optics section including one or more surfaces adapted to form a symmetrical arrangement around a common point of origin;
a secondary optics section including a plurality of secondary optics subsections arranged at different field angles to intercept and capture different portions of light output by the monocentric primary optics at the different field angles, wherein each secondary optics subsection is adapted to intercept at least a portion of light collected by the monocentric primary optics section to form a subimage as part of a full image in light collected by the monocentric primary optics section, and wherein combination of the primary optics section and the secondary optics section is adapted to form subimages by the secondary optics subsections that collectively represent the full image in light collected by the monocentric primary optics section.

2. The system of claim 1, wherein each of the secondary optics subsections fits within a conical volume radiating from the common point of origin of the primary optics section.

3. The system of claim 1, wherein each of the secondary optics subsections is adapted to correct on-axis aberrations produced by the monocentric primary optics section, and each of the secondary optics subsections includes a component that is rotationally symmetric around the optical axis of the corresponding secondary optics subsection.

4. The system of claim 1, wherein all of the secondary optics subsections have substantially similar shape, material and focal planes.

5. The system of claim 1, comprising:
a plurality of imaging sensors that are coupled to receive light from the plurality of secondary optics subsections, respectively; and
a signal processing component that combines individual images from the imaging sensors into a single image.

6. The system of claim 1, comprising an aperture stop for each combination of the primary optics section-secondary optics subsection, wherein the aperture stop is located within the secondary optics subsection.

7. The system of claim 1, where at least a portion of the primary optics section provides an optomechanical reference surface for alignment of a secondary optics subsection.

8. The system of claim 1, wherein the primary optics section comprises spherical or hemispherical elements.

9. The system of claim 1, wherein the secondary optics section comprises a plurality of subsections and each subsection comprises a plurality of lenses.

10. The system of claim 9, wherein each subsection comprises a field lens near an internal image plane and one or more secondary lenses which form an image of the internal image plane.

11. The system of claim 1, wherein at least a portion the secondary optics section provides lateral mechanical registration of the individual remaining elements of the secondary lens and detector systems.

12. The system of claim 1, wherein the image is formed at multiple discrete image regions, each image region corresponding to a field of view captured by a combination of the monocentric primary optics section and a secondary optics subsection.

13. The system of claim 12, further comprising a plurality of image sensing elements positioned at the multiple discrete image regions and configured to sense images formed at each of the multiple discrete image regions.

14. An integrated imaging system, comprising:
a monocentric objective;
one or more substantially hemispherical three-dimensional optical components positioned to at least partially surround the monocentric objective, where each of the three-dimensional optical components comprises a plurality of optical elements, each of the plurality of optical elements is positioned to intercept light collected by the monocentric objective at a particular field of view; and
a plurality of image sensors, wherein each image sensor of the plurality of image sensors is integrated into a corresponding subsection of a wafer level camera optics section.

15. The system of claim 14, wherein each secondary optics subsection is structured to correct on-axis aberrations produced by the monocentric primary optics section.

16. The system of claim 14, wherein all of the secondary optics subsections have substantially similar shape, material and focal planes.

17. A method, comprising:
receiving light at a monocentric primary optics section of a monocentric multi-scale imaging device, the monocentric primary optics section comprising one or more surfaces adapted to form a symmetrical arrangement around a common point of origin; and
forming an image using a secondary optics section of the monocentric multi-scale imaging device, the secondary optics section comprising a plurality of secondary optics subsections arranged at different field angles to intercept and capture different portions of light output by the monocentric primary optics at the different field angles, wherein each secondary optics subsection is adapted to intercept at least a portion of the light received by the monocentric primary optics sectional,
wherein forming an image comprises combining a plurality of individual images produced by the secondary optics subsections into a single image.

18. The method of claim 17, wherein each of the secondary optics subsections fits within a conical volume radiating from the common point of origin of the primary optics section.

19. The system of claim 17, wherein each of the secondary optics subsections is adapted to correct on-axis aberrations produced by the monocentric primary optics section, and each of the secondary optics subsections includes a component that is rotationally symmetric around the optical axis of the corresponding secondary optics subsection.

20. The method of claim 17, wherein all of the secondary optics subsections have substantially similar shape, material and focal planes.

21. The method of claim 17, further comprising providing an aperture stop for each combination of the primary optics section-secondary optics subsection within the secondary optics subsection of the monocentric multi-scale imaging device.

22. The method of claim 17, further comprising aligning a secondary optics subsection using at least a portion of the primary optics section as an optomechanical reference surface.

23. The method of claim 17, wherein the primary optics section comprises spherical or hemispherical elements.

24. The method of claim 17, wherein the secondary optics section comprises a plurality of subsections and each subsection comprises a plurality of lenses.

25. The method of claim 24, wherein each subsection comprises a field lens near an internal image plane and a plurality of secondary lenses which form an image of the internal image plane.

26. The method of claim 17, wherein at least a portion the secondary optics section provides lateral mechanical registration of the individual remaining elements of the secondary lens and detector systems.

27. The method of claim 17, wherein forming the image comprises producing multiple discrete images, and wherein each of the multiple discrete images corresponds to a field of view of the monocentric multi-scale imager captured by a combination of the monocentric primary optics section and a secondary optics subsection.

28. The method of claim 27, further comprising sensing each of the multiple discrete images using image sensing elements positioned at the multiple discrete image locations.

29. The method of claim 17, comprising using each secondary optics subsection to correct on-axis aberrations produced by the monocentric primary optics section in forming a corresponding individual image from received light.

* * * * *